United States Patent
Igarashi

(10) Patent No.: US 6,752,465 B2
(45) Date of Patent: Jun. 22, 2004

(54) SEAT FRAMEWORK FOR BUS

(75) Inventor: Fumio Igarashi, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/342,314

(22) Filed: Jan. 15, 2003

(65) Prior Publication Data

US 2003/0141752 A1 Jul. 31, 2003

(30) Foreign Application Priority Data

Jan. 30, 2002 (JP) ........................................ 2002-021074
Jan. 31, 2002 (JP) ........................................ 2002-022684

(51) Int. Cl.[7] .............................................. A47C 7/02
(52) U.S. Cl. .............................. 297/452.18; 297/452.2; 297/440.15; 296/63
(58) Field of Search .................... 297/452.18, 452.2; 296/63

(56) References Cited

U.S. PATENT DOCUMENTS

| | | | | |
|---|---|---|---|---|
| 3,630,566 A | * | 12/1971 | Barecki ........................ | 296/63 |
| 3,747,979 A | * | 7/1973 | Barecki ........................ | 296/63 |
| 3,899,211 A | * | 8/1975 | Barecki ........................ | 296/63 |
| 5,636,901 A | * | 6/1997 | Grilliot et al. .......... | 297/452.18 |
| 5,655,816 A | * | 8/1997 | Magnuson et al. ....... | 297/452.2 |
| 5,826,945 A | * | 10/1998 | Siebler et al. .......... | 297/452.18 |
| 5,913,567 A | * | 6/1999 | Novak et al. ........ | 297/452.18 X |

FOREIGN PATENT DOCUMENTS

JP        2000-23776        1/2000

* cited by examiner

*Primary Examiner*—Anthony D. Barfield
(74) *Attorney, Agent, or Firm*—Browdy and Neimark, P.L.L.C.

(57) ABSTRACT

A seat framework for use in a bus, which is basically from by a tubular seat back frame member and a tubular seat cushion frame member. The seat framework is fixed via a support leg element on a floor of the bus and provided with a reinforcement element which includes an angle portion of L-shaped cross-section and a tubular portion. The reinforcement element is provided between the seat framework and the support leg element, such that the angle portion thereof is fixed on either of the two lateral frame portions of the seat back frame member, while the tubular portion thereof is fixedly connected with the support leg element. The reinforcement element may be so formed as to include two angle portions and a tubular intermediate portion defined between the two angle portions.

7 Claims, 3 Drawing Sheets

US 6,752,465 B2

SEAT FRAMEWORK FOR BUS

BACKGROUND OF THE INVENTION

1. Field of the Invention

The present invention relates to a seat framework for use in a bus seat, and in particular to an structurally improved seat framework for use in a bus.

2. Description of Prior Art

In general, a whole of seat framework for use in a bus is formed by welding together some separate tubular frame members. Typically, as shown in FIG. 5, such bus seat framework is basically comprised of: a tubular seat back frame member (1); a tubular seat cushion frame member (2); a pair of first and second connecting tubular members (5A) (5B), each being of generally "L" shape; and a tubular support leg member (3).

As shown, the tubular seat back frame member (1) and tubular seat cushion frame member (2) are each formed by bending a tubular material into a generally "U" shape. Also, the tubular support leg member (3) is formed by bending a tubular material into a generally "inverted U" shape. The two lateral frame portions (11) (11) of the seat back frame member (1) are connected and welded to the respective upper two ends of the first and second tubular connecting members (5A) (5B), whereas, likewise, the two lateral frame portions (21A) (21A) of the seat cushion frame member (2) are connected and welded to the respective lower two ends of the first and second tubular connecting members (5A) (5B). Another separate tubular member (22) is firmly connected between those two connecting tubular members (5) by welding, so that the seat cushion frame member (2) has a forward tubular cross frame portion (21) and a backward tubular cross frame portion (22).

The inverted-U-shaped tubular support leg member (3) is fixedly welded at its two vertical leg portions (31) (31) to a floor (F) of bus at a point near to an aisle floor (F1).

Designations (6) (6) denote a pair of angle pieces each having an "L" shaped cross-section. As shown, each angle piece (6) is fixed to each vertical frame portion (11) of the seat back frame member (1) as well as to each vertical portion of the connecting tubular member (5), thereby preventing deformation of both two vertical frame portions (11) when a front-side great load (FL) is applied from the forward side of seat framework in a direction backwardly of bus.

One of the two lateral frame portions (21A) of the seat cushion frame member (2) and the corresponding horizontal potion of the connecting tubular member (5) that is fixed thereto are welded on the upper surface (90A) of a support member (90) provided at a window side of bus (not shown). On the other hand, the forward and backward tubular cross frame portions (21) (22) of seat cushion frame member (2) are welded on the upper horizontal portion (32) of the support leg member (3).

In this conventional bus seat framework, a support bracket (7) is welded to the corner portion (52) of the first tubular connecting member (5A) and fastened on the upper surface (90A) of support member (90). Further, a rectangular reinforcement member (8) having a rectangular cross-section is firmly connected, by welding, between the corner portion (52) of the second tubular connecting member (5B) and the corner portion (32U) of the leg member (3). Such structure is designed to withstand a back-side great load (BL) applied from the back side of seat framework in a direction forwardly of bus so as to prevent deformation of the seat cushion frame member (2) and separation of the same from the support member (90) and leg member (3) when that load (BL) is applied to the seat framework.

However, the above-described conventional bus seat framework has been found defective in requiring a number of separate reinforcing elements, such as the bracket (7) and rectangular reinforcement member (8), which means that the assembly of the seat framework is time-consuming and troublesome.

SUMMARY OF THE INVENTION

In view of the above-stated drawbacks, it is a primary purpose of the present invention to provide an improved seat framework for bus which is of simplified structure which does not require a number of separate parts and elements.

In order to achieve such purpose, in accordance with the present invention, there is provided a seat framework in combination with a bus having a floor therein, which basically comprises:

a tubular seat back frame member of a generally inverted-U-shaped configuration including a horizontal frame portion and a pair of vertical lateral frame portions extending vertically from the horizontal frame portion, the tubular seat back frame member extending in a direction transversely of the bus, thus having a forward plane facing to a side forwardly of the bus and a backward plane facing to a side backwardly of the bus;

a tubular seat cushion frame member including: a forward cross frame portion facing to the side forwardly of the bus; a pair of horizontal lateral frame portions extending horizontally from the forward cross frame portion; and a backward cross frame portion facing to the side backwardly of the bus;

the pair of vertical lateral frame portions of the tubular seat back frame member being firmly connected with the pair of horizontal lateral frame portions of the tubular seat cushion frame member, respectively;

whereupon the seat framework has a forward side facing to the side forwardly of the bus and a backward side facing to the side facing to the side backwardly of the bus, a support leg means for supporting the seat cushion frame member thereupon, the support leg means being fixed on the floor of bus; and a reinforcing means fixedly provided between the tubular seat back frame member and the support leg means, wherein the reinforcing means is basically formed from a tubular material in such a manner as to reinforce the tubular seat back frame member and the tubular seat cushion frame member against deformation due to one great load applied toward the forward side of seat framework and due to another great load applied toward the backward side of seat framework.

In one aspect of the present invention, the reinforcing means may include: an angle portion of "L" shape in cross-section which is formed by subjecting one end portion of the tubular material to press working; and a tubular portion defined at another end portion of the tubular material. The angle portion may be fixed on and along either of said pair of vertical lateral frame portions of said tubular seat back frame, while the tubular portion be fixedly connected with the support leg means.

In another aspect of the present invention, the reinforcing means may include: a first angle portion of "L" shape in cross-section which is formed by subjecting one end portion of the tubular material to press working; a second angle portion of "L" shape in cross-section which is formed by subjecting another end portion of the tubular material to press working; and an intermediate curved tubular portion defined between the first and second angle portions. The first angle portion may be fixed on and along either of said pair of vertical lateral frame portions of said tubular seat back frame member, while said second angle portion be fixedly connected with said support leg means.

Other various features and advantages will become apparent from reading of the descriptions hereinafter, with reference to the annexed drawings.

DETAILED DESCRIPTION OF PREFERRED EMBODIMENTS OF THE INVENTION

Referring to FIGS. 1 to 4, there is illustrated an exemplary preferred embodiment of seat framework for use in or adapted to be provided in a bus seat, as generally designated by (SF), in accordance with the present invention.

The illustrated seat framework (SF) is basically comprised of a tubular seat back frame member (4); a tubular seat cushion frame member (3); and a tubular support leg member (7) provided as typical one mode of support leg means for supporting those two frame members (4) (3).

Figure 1:
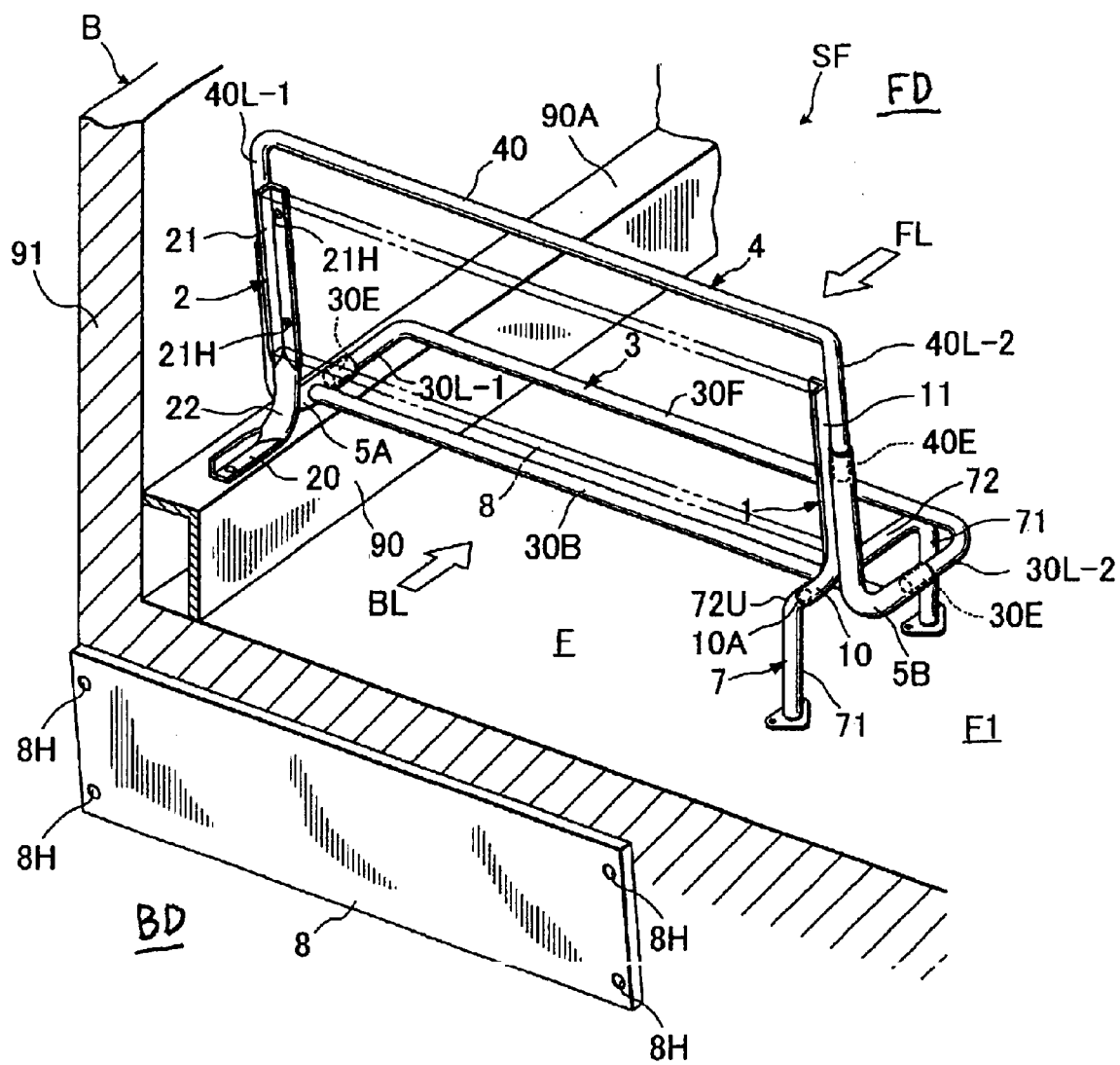
FIG. 1 is a partly broken schematic perspective view showing a seat framework for bus in accordance with the present invention, which is provided in a bus.

As seen from FIG. 1, the seat framework (SF) is provided in a bus (B). The bus (B) has a floor (F) and a window-side wall (91). In the present embodiment, a support member (90) (formed from a rigid metallic material) is provided as another preferred mode of support leg means and disposed at the boundary corner area between the floor (F) and window-side wall (91), extending upwardly from the floor (F) to a predetermined level. The illustrated support member (90) is not limitative, but any other suitable mode of the support leg means may be provided instead thereof, insofar as it serves to stably support the two frame members (4) (3) in conjunction with the tubular leg member (7).

The tubular seat back frame member (4) is formed by bending a tubular hard metallic material into a generally inverted-U-shaped configuration having a horizontal tubular frame portion (40) and a pair of first and second tubular vertical lateral frame portions (40L-1) (40L-2) extending vertically from the horizontal tubular cross frame portion (40). On the other hand, the tubular seat cushion frame member (3) is formed by bending a tubular hard metallic material into a generally "U" shape having a tubular cross frame portion (30F) and a pair of first and second horizontal lateral tubular frame portions (30L-1) (30L-2) extending horizontally from the tubular cross frame portion (30F).

Designations (5A) (5B) denote a first tubular connecting member and a second tubular connecting member, respectively. The two connecting members (5A) (5B) are each formed by bending a tubular hard metallic material into a generally "L" shape. As understandable from FIGS. 2 to 4, each of those first and second tubular connecting members (5A) (5B) has a horizontally extending tubular portion (51), an upwardly extending tubular portion (50), and a bent tubular corner portion (52) defined between those horizontally and upwardly extending tubular portions (51) (50).

Figure 2:
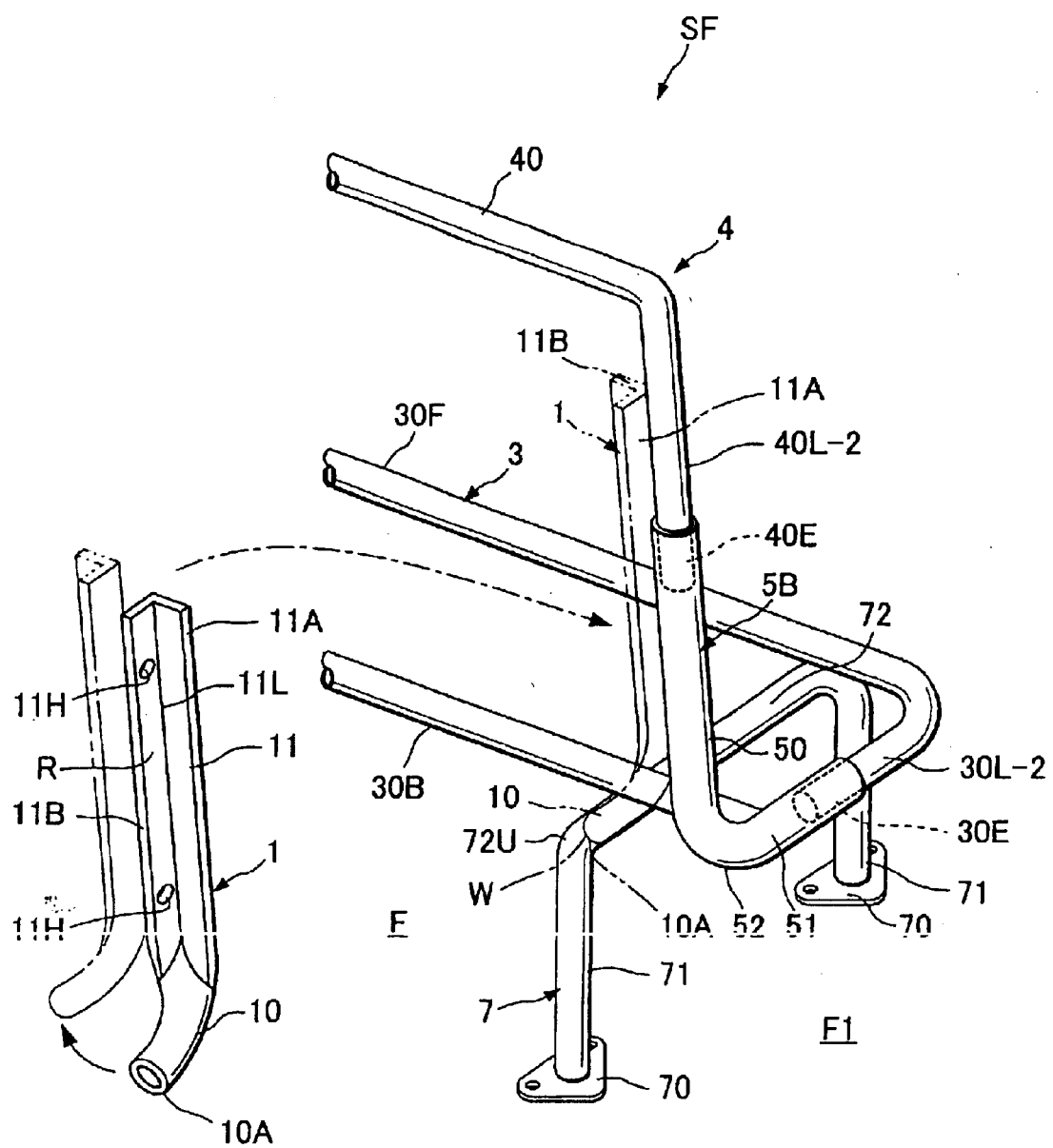
FIG. 2 is a partly broken fragmentary perspective view showing one mode of principal part of the seat framework and how one mode of reinforcement member is fixed to the seat framework.

The tubular support leg member (7) is formed by bending a tubular hard metallic material into the illustrated generally inverted-U-shaped configuration having an upper tubular horizontal portion (72) and a pair of vertical tubular leg portions (71) (71) each having a securing plate member (70) formed in the lower end thereof. This support leg member (7) is shown in FIG. 2 as being welded at the securing plate members (70) (70) thereof to the floor (F) of bus (B) at a point near to an aisle floor (F1). It is noted here that a height of the support leg member (7) (i.e. a distance between the floor (F) and the upper horizontal tubular portion (72) of support leg member (7)) is equal to a height of the afore-said support member (90) (i.e. a distance between the floor (F) and the upper surface (90A) of support member (90)).

The first and second vertical tubular lateral frame portions (40L-1) (40L-2) of seat back frame member (4) are each inserted and fixed, at their respective ends (40E) (40E), in the end portion of the vertically extending tubular portion (50) of each of the two tubular connecting members (5A) (5B).

Also, the first and second tubular horizontal lateral frame portions (30L-1) (30L-2) of seat cushion frame member (3) are each inserted and fixed, at their respective ends (30E) (30E), in the end portion of the horizontally extending tubular portion (51) of each of the two tubular connecting frame members (5A) (5B).

A tubular cross frame member (30B), formed from a tubular hard metallic material, is firmly connected, by welding, between the two horizontally extending tubular portions (51) (51) respectively of the first and second tubular connecting members (5A) (5B). In this respect, it is to be understood that the seat cushion frame (3) has a forward tubular cross frame portion (30F) and a backward tubular cross frame portion (30B) In that way, a basic bus seat framework unit comprising the seat cushion frame member (3) and seat back frame member (4) is produced.

Now, a description will be made of how such basic bus seat framework unit is firmly mounted on the foregoing support leg member (71) and the support member (90), using a novel simplified reinforcing means to be elaborated below.

Figure 3:
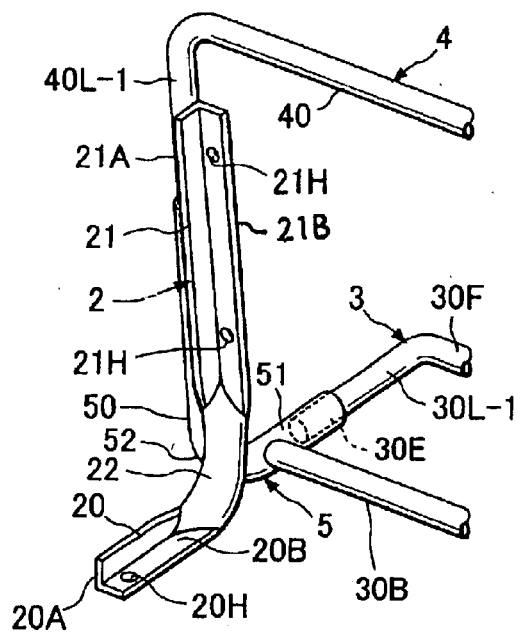
FIG. 3 is partly broken fragmentary perspective view showing another mode of principal part of the seat framework.

As viewed and understandable from FIGS. 1 and 3, the horizontally extending tubular portion (51) of first tubular connecting member (5A) as well as the first tubular lateral frame portion (30L-1) of seat cushion frame member (3) are welded upon the upper surface (90A) of support member (90). On the other hand, the right-side local part of the forward tubular cross frame portion (30F), near to the second lateral tubular frame portion (30L-2), is welded upon the upper horizontal tubular portion (72) of support leg member (7), while likewise, the right-side local part of the backward tubular cross frame portion (30B), near to that second lateral tubular frame portion (30L-2), is welded upon that support leg member's upper horizontal tubular portion (72). As viewed from FIG. 1, the seat back frame member (4) extends in a direction transversely of the bus (B), thus having a forward plane facing to a side (at FD) forwardly of the bus (B) and a backward plane facing to a side (at BD) backwardly of the bus (B). It follows that the forward and backward cross frame portions (30F) (30B) of seat cushion frame member (3) respectively face to those forward and backward planes of seat back frame member (4), whereupon the seat framework (SF) has a forward side facing to the forward side (FD) of bus (B) and a backward side facing to the backward side (BD) of bus (B).

It is noted that the two connecting members (5A) (5B) are not limitative, but, instead thereof, the first and second vertical lateral frame portions (40L-1) (40L-2) of seat back frame member (4) may be directly connected as by welding with the first and second horizontal lateral frame portions (30L-1) (30L-2) of seat cushion frame member (3), respectively.

In accordance with the present invention, there is provided a novel reinforcing means having a simplified structure for reinforcing and protecting the above-constructed seat framework (SF) against deformation due to one great load applied to the forward side of the seat framework (SF) and due to another opposite great load applied to the backward side of the seat framework (SF).

Basically, referring to FIG. 1, it is within the generic concept of the present invention to provide a structurally simplified reinforcing means for reinforcing and protecting both seat back frame member (4) and seat cushion frame member (3) not only against a back-side great load (BL) applied from the back side of seat framework (SF) to the forward side (FD) of bus (B), but also against a front-side great load (FL) applied from the forward side of seat framework (SF) to the backward side (BD) of bus (B).

By way of example, referring to FIGS. 1 and 2, one preferred mode of such reinforcing means may be a first reinforcement member designated by (1). As best seen from FIG. 2, the first reinforcement member (1) comprises a lower curved tubular portion (10) and a rectilinearly extending upper angle portion (11) of "L" shape in cross-section. Formation of the reinforcement member (1) is such that a required upper portion (e.g. about ⅔) of a tubular material is subjected to press working to form an angle portion of "L" shaped cross-section, thereby defining the illustrated upper angle portion (11) wherein a first plate section (11A) and a second plate section (11B) are each defined at the angle of 45 degrees in relation to a central rectilinear line (11L). Hence, as in FIG. 1, a right-angled corner recession (R) is defined in the upper angle portion (11). Designations (11H) (11H) respectively denote a pair of securing holes formed in the first plate section (11A), which are to be used for securing a back board (8) to the seat back frame member (4).

Further, other lower remnant tubular portion (10) is so curved as to extend downwardly and curviliearly from that upper angle portion (11), with the central axis thereof extending curvilinearly from and along the central rectilinear line (11L). In other words, the tubular portion (10) extends curvilinarly in a direction from the right-angled corner recession (R) to a side forwardly of the reinforcement member (1) as viewed from FIG. 1.

The first reinforcement member (1) so formed is provided between the seat back frame member (4) and the support leg member (7) as indicated by the two-dotted chain line in FIG. 2. Specifically, the first plate section (11A) of the reinforcement member (1) is welded on and along the seat back frame's second lateral frame portion (40L-2) and the upwardly extending portion (50) of second connecting member (5B). Also, the end (10A) of the tubular portion (10) is welded to the corner portion (72U) of the support leg member (7) as indicated by the designation (W).

Figure 4:
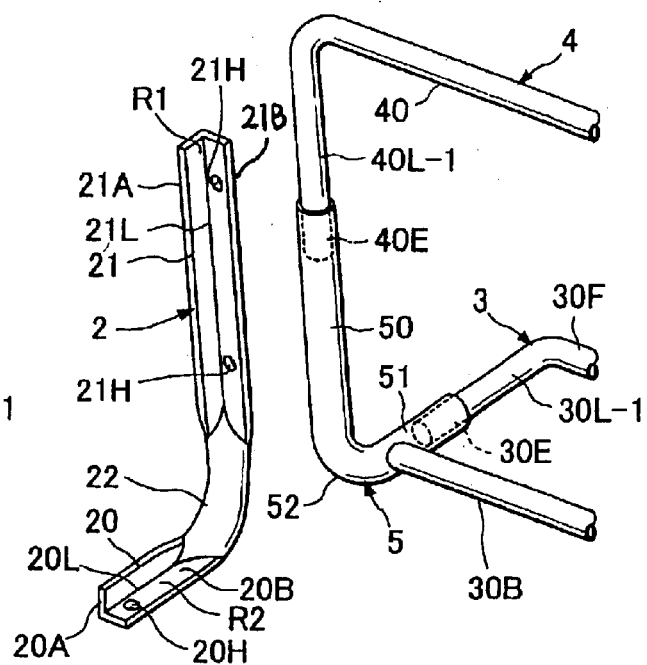
FIG. 4 is partly broken fragmentary perspective view of that another mode shown in FIG. 3, which shows how another mode of reinforcement member is fixed with the seat framework.
Figure 5:
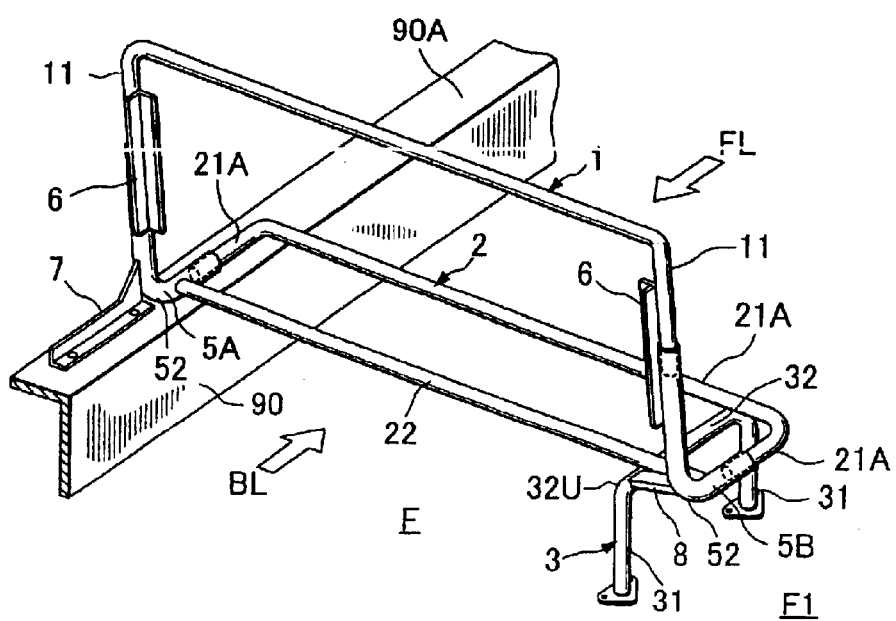
FIG. 5 is a partly broken schematic perspective view of a conventional seat framework for bus.

Reference is now made to FIGS. 3 and 4 which show another preferred mode of the previously stated reinforcing means, which is a second reinforcement member designated by (2). As best seen from FIG. 4, the second reinforcement member (2) comprises: a horizontally extending lower angle portion (20) of "L" shape in cross-section; a vertically extending upper angle portion (21) of "L" shape in cross-section; and a curved tubular intermediate portion (22) defined between the lower and upper angle portions (20) (21).

Formation of this second reinforcement member (2) is by pressing a required length of upper portion (e.g. about ⅔) of a tubular material into an angle portion of "L" shaped cross-section, thereby forming the vertically extending upper angle portion (21) and pressing a required length of lower portion (e.g. about ⅓) of the tubular material opposite to the upper angle portion (21) into the lower angle portion (20) of "L" shaped cross-section, so that a tubular intermediate portion (22) is defined between those upper and lower angle portions (21) (20). As shown, the tubular intermediate portion (22) is curved, whereupon the lower angle portion (20) extends horizontally while the upper angle portion (21) extend vertically therefrom in the present second reinforcement member (2).

Accordingly, it is observed that, in the vertically extending upper angle portion (21), first and second plate sections (21A) (21B) are each defined at the angle of 45 degrees relative to the central rectilinear line (21L), thus defining a first right-angled corner recession (R1) therein, whereas in the horizontally extending lower angle portion (20), another first and second plate sections (20A) (20B) are each defined at the angle of 45 degrees relative to the central rectilinear line (20L), thus defining a second right-angled corner recession (R2) therein. It is therefore seen that the intermediate tubular portion (10) is curvilinearly defined between the upper and lower angle portions (21) (20), with the central axis thereof curvilinearly extending from and along the central rectilinear line (21L) of upper angle portion (21) to the central rectilinear line (20L) of lower angle portion (20). Thus, the tubular intermediate portion (22) extends curvilinearly from the first right-angled corner recession (R1) to the second right-angled corner recession (R2). Designations (21H) (21H) respectively denote a pair of securing holes formed in the second plate section (21B), which are to be used for securing a back board (8) to the seat back frame member (4). The back board (8) has four securing holes (8H) formed therein as illustrated.

The second reinforcement member (2) so formed is provided between the seat back frame member (4) and the support leg member (7) as understandable from FIG. 4 to FIG. 3. Specifically, the first plate section (21A) of the reinforcement member (2) is welded on and along the seat back frame's first lateral frame portion (40L-1) and the upwardly extending portion (50) of second connecting member (5B). On the other hand, the second plate section (20B) of the reinforcement member (2) is firmly fastened upon the upper surface (90A) of the support member (90) by inserting a securing screw (not shown) in a securing hole (20H) formed in that second plate (20B) and driving it into the support member upper surface (90A), as understandable from FIGS. 1 and 3.

Finally, one back board (8) is fixedly secured to the seat back frame member (4) by inserting securing bolts (not shown) into the aligned holes (8H) (11H) (21H) and threadedly secured by nuts (not shown).

In that manner, a whole seat framework (SF) is assembled and firmly provided in the bus (B) as shown in FIG. 1. With this structure, a front-side great load (FL), which is applied to the forward side of seat framework (SF) in the backward direction of bus (B), is transmitted to both two upper angle portions (11) (21) respectively of the first and portion (11) of the first reinforcement member (1) as well as to the lower angle portion (20) of the second reinforcement member (2). As a result, the thus-transmitted load (FL) is immediately escaped to the floor (F) through the support leg member (7) and support member (90), whereby both seat back frame member (4) and seat cushion frame member (3) are effectively prevented against deformation and breakage due to that load (FL). Also, when a back-side great load (BL) is applied to the backward side of seat framework (SF) in the forward direction of bus (B), it is received by both two upper angle portions (11) (21) respectively of the first and second reinforcement member (1) and quickly transmitted to the lower curved tubular portion (10) of the first reinforcement member (1) as well as to the lower angle portion (20) of the second reinforcement member (2). As a result, the thus-transmitted load (FL) is immediately escaped to the floor (F) through both support leg member (7) and support member (90), whereby both seat back frame member (2) and seat cushion frame member (3) are effectively prevented against deformation and breakage due to that great load (BL).

Moreover, in accordance with the present invention, both first and second reinforcement members (1) (2) are formed only from one tubular material and can be produced with much ease and simplified structure, thus requiring no other separate reinforcement element as found in the prior art. That is, the first reinforcement member (1) is simply subjected at the lower portion thereof to press working to form the upper angle portion (11) and also simply curved at the lower portion thereof into the lower curved tubular portion (10). The lower curved tubular portion (10) can be easily and directly connected with the support leg member (7). Further, the second reinforcement member (2) is also simply subjected at its both upper and lower portions to press working to form the upper and lower angle portions (21) (20) with the curved tubular intermediate portion (22) defined therebetween.

It should be understood that the present invention is not limited to the illustrated embodiment, but any other modification, replacement and addition may be applied thereto without departing from the appended claims.

What is claimed is:

1. A seat framework in combination with a bus having a floor therein, comprising:
   a tubular seat back frame member of a generally inverted-U-shaped configuration including a horizontal frame portion and a pair of vertical lateral frame portions extending vertically from said horizontal frame portion, said tubular seat back frame member extending in a direction transversely of said bus, thus having a forward plane facing to a side forwardly of said bus and a backward plane facing to a side backwardly of said bus;
   a tubular seat cushion frame member including: a forward cross frame portion facing to said side forwardly of said bus; a pair of horizontal lateral frame portions extending horizontally from said forward cross frame portion; and a backward cross frame portion facing to said side backwardly of said bus;
   said pair of vertical lateral frame portions of said tubular seat back frame member being firmly connected with said pair of horizontal lateral frame portions of said tubular seat cushion frame member, respectively;
   whereupon the seat framework has a forward side facing to the side forwardly of the bus and a backward side facing to the side backwardly of the bus;
   a support leg means for supporting said seat cushion frame member thereupon, said support leg means being fixed on said floor of said bus; and
   a reinforcing means fixedly provided between said tubular seat back frame member and said support leg means, said reinforcing means being basically formed from a tubular material in such a manner as to reinforce said tubular seat back frame member and said tubular seat cushion frame member against deformation due to one great load applied toward said forward side of the seat framework and due to another great load applied toward said backward side of the seat framework, wherein said reinforcing means comprises an angle portion of "L" shape in cross-section, said angle portion being fixed on and along either of said pair of vertical lateral frame portions of said tubular seat back frame.

2. A seat framework in combination with a bus having a floor therein, comprising:
   a tubular seat back frame member of a generally inverted-U-shaped configuration including a horizontal frame portion and a pair of vertical lateral frame portions extending vertically from said horizontal frame portion, said tubular seat back frame member extending in a direction transversely of said bus, thus having a forward plane facing to a side forwardly of said bus and a backward plane facing to a side backwardly of said bus;
   a tubular seat cushion frame member including: a forward cross frame portion facing to said side forwardly of said bus; a pair of horizontal lateral frame portions extending horizontally from said forward cross frame portion; and a backward cross frame portion facing to said side backwardly of said bus;
   said pair of vertical lateral frame portions of said tubular seat back frame member being firmly connected with said pair of horizontal lateral frame portions of said tubular seat cushion frame member, respectively;
   whereupon the seat framework has a forward side facing to the side forwardly of the bus and a backward side facing to the side backwardly of the bus;
   a support leg means for supporting said seat cushion frame member thereupon, said support leg means being fixed on said floor of said bus; and
   a reinforcing means fixedly provided between said tubular seat back frame member and said support leg means, said reinforcing means being basically formed from a tubular material in such a manner as to reinforce said tubular seat back frame member and said tubular seat cushion frame member against deformation due to one great load applied toward said forward side of the seat framework and due to another great load applied toward said backward side of the seat framework, wherein said reinforcing means includes: an angle portion of "L" shape in cross-section which is formed by subjecting one end portion of said tubular material to press working; and a tubular portion defined at another end portion said tubular material, and wherein said angle portion is fixed on and along either of said pair of vertical lateral frame portions of said tubular seat back frame member, while said tubular portion is fixedly connected with said support leg means.

3. A seat framework in combination with a bus having a floor therein, comprising:

a tubular seat back frame member of a generally inverted-U-shaped configuration including a horizontal frame portion and a pair of vertical lateral frame portions extending vertically from said horizontal frame portion, said tubular seat back frame member extending in a direction transversely of said bus, thus having a forward plane facing to a side forwardly of said bus and a backward plane facing to a side backwardly of said bus;

a tubular seat cushion frame member including: a forward cross frame portion facing to said side forwardly of said bus; a pair of horizontal lateral frame portions extending horizontally from said forward cross frame portion; and a backward cross frame portion facing to said side backwardly of said bus;

said pair of vertical lateral frame portions of said tubular seat back frame memory being firmly connected with said pair of horizontal lateral frame portions of said tubular seat cushion frame member, respectively;

whereupon the seat framework has a forward side facing to the side forwardly of the bus and a backward side facing to the side backwardly of the bus;

a support leg means for supporting said seat cushion frame member thereupon, said support leg means being fixed on said floor of said bus; and a reinforcing means fixedly provided between said tubular seat back frame member and said support leg means, said reinforcing means being basically formed from a tubular material in such a manner as to reinforce said tubular seat back frame member and said tubular seat cushion frame member against deformation due to one great load applied toward said forward side of the seat framework and due to another great load applied toward said backward side of the seat framework, wherein said reinforcing means includes: a first angle portion of "L" shape in cross-section which is formed by subjecting one end portion of said tubular material to press working; a second angle portion of "L" shape in cross-section which is formed by subjecting another end portion of said tubular material to press working; and a curved intermediate tubular portion defined between said first and second angle portions, and wherein said first angle portion is fixed on and along either of said pair of vertical lateral frame portions of said tubular seat back frame member, while said second angle portion is fixedly connected with said support leg means.

4. A seat framework in combination with a bus having a floor therein, comprising:

a tubular seat back frame member of a generally inverted-U-shaped configuration including a horizontal frame portion and a pair of vertical lateral frame portions extending vertically from said horizontal frame portion, said tubular seat back frame member extending in a direction transversely of said bus, thus having a forward plane facing to a side forwardly of said bus and a backward plane facing to a side backwardly of said bus;

a tubular seat cushion frame member including: a forward cross frame portion facing to said side forwardly of said bus; a pair of horizontal lateral frame portions extending horizontally from said forward cross frame portion; and a backward cross frame portion facing to said side backwardly of said bus, said pair of vertical lateral frame portions of said tubular seat back frame member being firmly connected with said pair of horizontal lateral frame portions of said tubular seat cushion frame member, respectively;

whereupon the seat framework has a forward side facing to the side forwardly of the bus and a backward side facing to the side backwardly of the bus;

a support leg means for supporting said seat cushion frame member thereupon, said support leg means being fixed on said floor of said bus, and a reinforcing means fixedly between said tubular seat back frame member and said support leg means, said reinforcing means being basically formed from a tubular material in such a manner as to reinforce said tubular seat back frame member and said tubular seat cushion frame member against deformation due to one great load applied toward said forward side of the seat framework and due to another great load applied toward said backward side of the seat framework, wherein said reinforcing means includes: a first angle portion of "L" shape in cross-section which is formed by subjecting one end portion of said tubular material to press working, a second angle portion of "L" shape in cross-section which is formed by subjecting another end portion of said tubular material to press working; and a curved intermediate tubular portion defined between said first and second angle portions, and wherein said first angle portion of said reinforcing means is fixed on and along one of said pair of vertical lateral frame portions of said tubular sat back frame, while said second angle portion of the reinforcing means is fixed on said upper surface of said support member.

5. The seat framework according to claim 4, wherein said support member extends upwardly from said floor, with the upper surface thereof being disposed at a predetermined level above said floor.

6. A seat framework in combination with a bus having a floor therein, comprising:

a tubular seat back frame member of a generally inverted-U-shaped configuration including a horizontal frame portion and a pair of vertical lateral frame portions extending vertically from said horizontal frame portion, said tubular seat back frame member extending in a direction transversely of said bus, thus having a forward plane facing to a side forwardly of said bus and a backward plane facing to a side backwardly of said bus;

a tubular seat cushion frame member including: a forward cross frame portion facing to said side forwardly of said bus; a pair of horizontal lateral frame portions extending horizontally from said forward cross frame portion; and a backward cross frame portion facing to said side backwardly of said bus, said pair of vertical lateral frame portions of said tubular seat back frame member being firmly connected, via a tubular connecting member, with said pair of horizontal lateral frame portions of said tubular seat cushion frame member, respectively;

whereupon the seat framework has a forward side facing to the side forwardly of the bus and a backward side facing to the side backwardly of the bus;

a support leg means for supporting said seat cushion frame member thereupon, said support leg means being fixed on said floor of said bus, said support le means including a generally inverted-U-shaped tubular support leg member having an upper horizontal portion and a pair of vertical leg portions fixed on said floor, said forward and backward cross frame portions being fixed partway on said upper horizontal portion of said generally inverted-U-shaped tubular support leg member; and a reinforcing means fixedly provided between said tubular seat back frame member and said support leg means, said reinforcing means being basically formed from a tubular material in such a manner as to reinforce said tubular seat back frame member and said tubular seat cushion frame member against deformation due to one great load applied toward said forward side of the seat framework and due to another great load applied toward said backward side of the seat framework, wherein said reinforcing means includes: an angle portion of "L" shape in cross-section which is formed by subjecting one end portion of said tubular material to press working; and a tubular portion defined in another end portion of the tubular material, and wherein said angle portion of said reinforcing means is fixed on and along one of said pair of vertical lateral frame portions of said tubular seat back frame member as well as on said tubular connecting member, while said tubular portion of the reinforcing means is fixedly connected with said generally inverted-U-shaped support leg member.

7. The seat framework according to claim 6, wherein said generally inverted-U-shaped support leg member includes a corner portion between said upper horizontal portion thereof and one of said pair of vertical leg portions thereof, and wherein said tubular portion of the reinforcing means is fixedly connected with said corner portion.

* * * * *